(12) United States Patent
Feller

(10) Patent No.: US 8,851,744 B1
(45) Date of Patent: Oct. 7, 2014

(54) CALIBRATION APPARATUS AND METHOD FOR HEAT TRANSFER MEASUREMENT

(71) Applicant: Murray F Feller, Micanopy, FL (US)

(72) Inventor: Murray F Feller, Micanopy, FL (US)

(73) Assignee: Onicon, Inc., Clearwater, FL (US)

( * ) Notice: Subject to any disclaimer, the term of this patent is extended or adjusted under 35 U.S.C. 154(b) by 0 days.

(21) Appl. No.: 14/044,806

(22) Filed: Oct. 2, 2013

(51) Int. Cl.
*G01K 19/00* (2006.01)
*G01K 15/00* (2006.01)

(52) U.S. Cl.
CPC ..................................... *G01K 15/005* (2013.01)
USPC ..................................... 374/1; 374/29; 374/31

(58) Field of Classification Search
CPC ................ G01K 15/005; G01K 15/002; G01J 2005/0048
USPC ............... 374/1–3, 29, 30, 137, 208, 31, 110, 374/112, 166
See application file for complete search history.

(56) References Cited

U.S. PATENT DOCUMENTS

| 3,260,102 | A  | * | 7/1966 | Werner | 374/1 |
| 3,918,300 | A | * | 11/1975 | Weisstuch et al. | 73/113.01 |
| 5,902,043 | A | * | 5/1999 | Price et al. | 374/39 |
| 6,561,692 | B2 | * | 5/2003 | Danley | 374/29 |
| 8,308,349 | B1 | * | 11/2012 | Feller | 374/29 |
| 2004/0028117 | A1 | * | 2/2004 | Cordes et al. | 374/179 |

* cited by examiner

*Primary Examiner* — Gail Verbitsky
(74) *Attorney, Agent, or Firm* — David Kiewit

(57) ABSTRACT

A calibrator for calibrating a compatible heat transfer meter comprises a temperature controlled reference thermowell and a reference temperature sensor. The reference thermowell is similar in dimensions to thermowells usable for measuring inlet and outlet temperatures of a heat exchanger so that the reference temperature sensor is selectively insertable into any of the thermowells. The calibrator also comprises temperature measurement circuitry operable to generate a temperature reading from an output of the reference temperature sensor; and control circuitry operable to control the temperature of the reference thermowell.

8 Claims, 4 Drawing Sheets

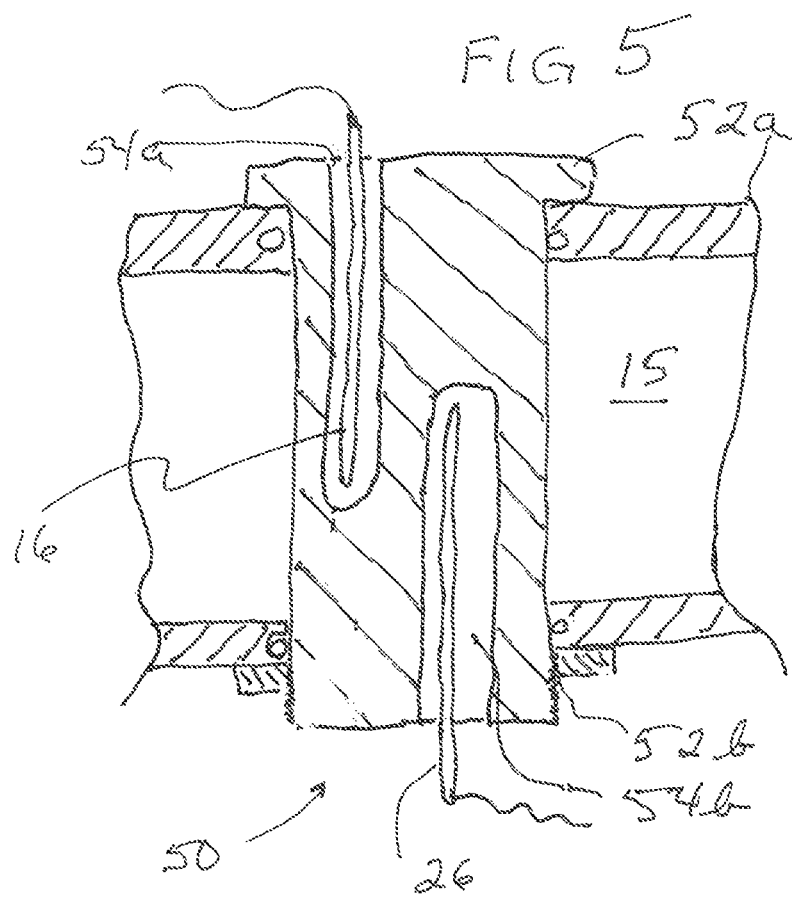

CALIBRATION APPARATUS AND METHOD FOR HEAT TRANSFER MEASUREMENT

BACKGROUND OF THE INVENTION

The invention addresses thermal measurements and, in particular, calibration of equipment used for heat transfer measurements.

BACKGROUND INFORMATION

Heat transfer meters (also known as heat energy flow meters or BTU meters) are commonly employed where multiple users share, and are individually billed for, thermal energy supplied by a single source. An example of such an arrangement can be found in space heating in multi-tenant buildings.

At the time of manufacture, a heat transfer meter is calibrated using precision temperature references to adjust the span and the zero differential temperature settings. Correct adjustment of that zero setting is particularly important because a small difference temperature error can result in a large heat transfer error. It is therefore imperative that that the zero setting be calibrated and maintained precisely.

Maintaining calibration in service can be difficult if the meter's two temperature sensors are spaced apart so that the two sensors cannot share a common temperature bath. This situation often occurs because of cable routing choices made during installation.

It would hence be desirable to have a calibrator which can check the temperature sensing ability of the meter at the time of its installation and periodically afterwards, and enable appropriate corrections to be made.

BRIEF SUMMARY OF THE INVENTION

An aspect of the invention is that it provides apparatus for calibrating a heat transfer meter that comprises a flow meter, a heat exchanger inlet temperature sensor and a heat exchanger outlet temperature sensor. The calibration apparatus comprises at least one thermowell respectively associated with each of the inlet and outlet temperature sensors; and a calibrator. The calibrator comprises a temperature controlled reference thermowell; a reference temperature sensor selectively insertable into any of the recited thermowells; temperature measurement circuitry operable to generate a temperature reading from an output of the reference temperature sensor; and control circuitry operable to control the temperature of the reference thermowell.

Another aspect of the invention is that it provides a method of calibrating a heat transfer meter by using a calibrator comprising: a temperature controlled reference thermowell; a reference temperature sensor; and control circuitry operable to control the temperature of the reference thermowell. In a preferred variation of the method the user first inserts the reference temperature sensor into a thermowell associated with a selected one of the inlet and outlet temperature sensors. The temperature of the reference thermowell is then regulated to be the same temperature as the temperature measured by the reference temperature sensor. Subsequently the other of the inlet and outlet temperature sensors is inserted into the reference thermowell. The heat transfer meter is then adjusted to cause the temperature indication provided by the other of the inlet and outlet temperature sensors to be the same as the temperature of the reference thermowell, and hence of the selected one of the inlet and outlet temperature sensors.

Another aspect of the invention is that it provides a method of calibrating a heat transfer meter by using a calibrator comprising: a temperature controlled reference thermowell; a reference temperature sensor; a flow rate simulator having an output representative of a simulated flow rate; and control circuitry operable to control the temperature of the reference thermowell. The method comprises inserting the reference temperature sensor into a thermowell associated with a selected one of the inlet and outlet temperature sensors; inserting the other of the outlet and inlet temperature sensors into the reference thermowell and controlling the temperature of the reference thermowell to differ from that of the reference sensor by a selected temperature difference; calculating, from the selected temperature difference and the simulated flow signal, a simulated value of heat transfer; and comparing the simulated heat transfer value to a heat transfer value output by the meter being calibrated.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 5 is a longitudinal cross-sectional view of a preferred thermowell where the plane of section contains an axis of the thermowell and an axis of a pipe.

FIG. 6 is a cross-sectional view taken in a plane perpendicular to that of FIG. 5.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1:
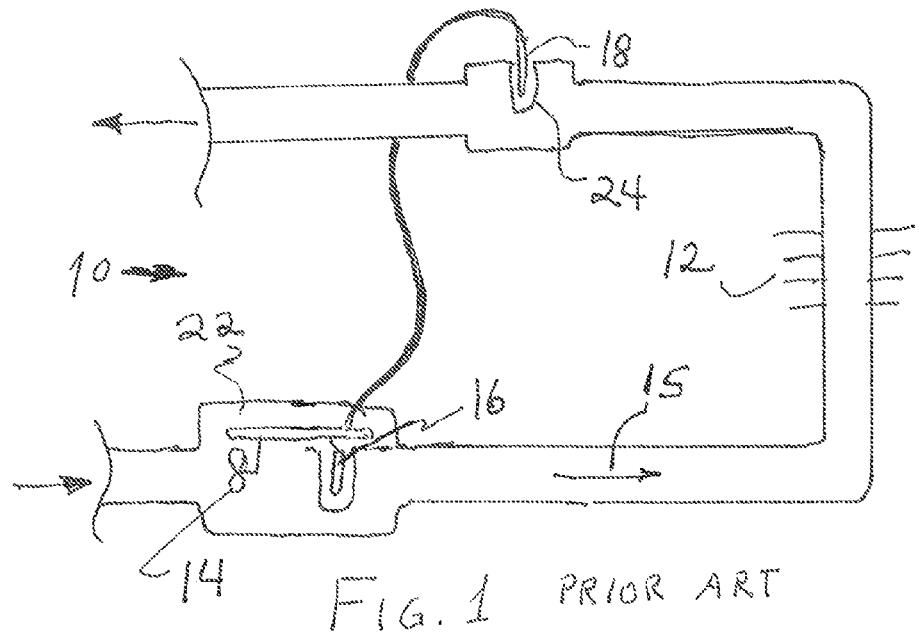
FIG. 1 is a schematic depiction of a prior art heat transfer meter installation
Figure 2:
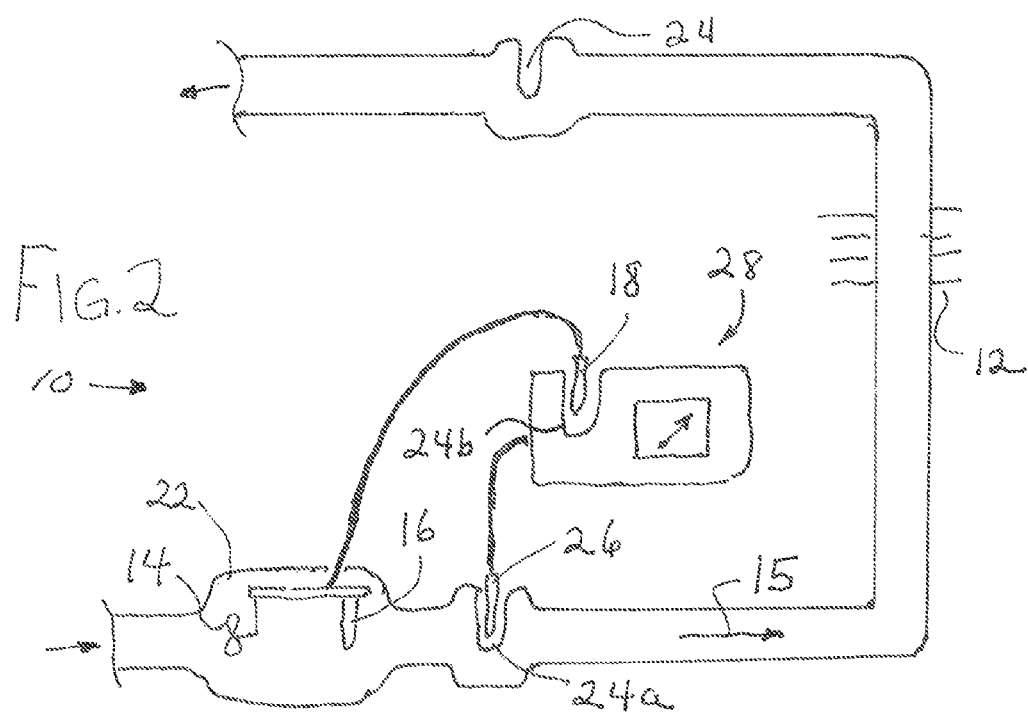
FIG. 2 is a schematic depiction of a calibrator of the invention being used to calibrate a heat transfer meter similar to that of FIG. 1.

FIG. 1 depicts a widely used configuration of a heat transfer meter 10 used with a heat exchanger 12. The heat transfer meter comprises a flow meter 14 for measuring a flow rate of working fluid 15 through the heat exchanger 12; an inlet temperature sensor 16 for measuring the temperature of working fluid delivered to the heat exchanger 12; and an outlet temperature sensor 18 for measuring the temperature of working fluid returned from the heat exchanger. In the depicted configuration, which is only one of several possible ones, the flow meter, one of the temperature sensors and the signal processing circuitry share a common housing 22 adjacent an inlet to the heat exchanger while the other temperature sensor 18 may be remotely disposed. The reader will appreciate that many sorts of flow sensor may be used and that the turbine-bladed 14 depiction in FIGS. 1 and 2 is merely exemplar. Moreover, although many heat transfer meters employ resistance temperature detectors for sensing temperature, the invention is not so limited and many sorts of known temperature sensors may be employed in its practice.

In some cases one of the temperature sensors (e.g., 16) is built into the heat transfer meter housing 22, while the other (e.g., 18) is removably installed in a thermowell 24 distal from the meter housing. In other cases, both inlet 16 and outlet 18 temperature sensors are installed in respective thermowells 24 from which they can be removed for calibration. A preferred heat transfer meter 10 of the invention is equipped with at least one thermowell respectively associated with each of the inlet and outlet temperature sensors, where the at least one thermowell provides a means for temporary installation of a reference temperature sensor 26 comprising a portion of a calibrator 28.

The reader should note that a thermowell is herein described as being "associated" with a temperature sensor if the thermowell experiences the same temperature as the associated temperature sensor. Thus, if an inlet temperature sensor 16 is built into a heat transfer meter's housing 22 and is inaccessible, the invention provides a separate, associated, thermowell 24a closely adjacent the housing 22 so that the additional thermowell 24a experiences the same temperature as the inlet temperature sensor 16. On the other hand, if both inlet and outlet temperature sensors are removably installed in respective thermowells; an additional thermowell is not needed. Preferred configurations for thermowells will be described hereinafter.

The reader will recognize that although the configurations depicted in FIG. 1 and FIG. 2 are common, there are many other configurations of the components that may be chosen. What is expected, in most cases, is that the inlet and outlet temperature measurement sites are spaced apart, as dictated by piping layout, etc. Moreover, one of the temperature sensors may be a considerable distance away from the rest of the heat transfer meter and its connecting cable may be inaccessible or buried in insulation. Hence, it is often impractical to move that sensor more than a few inches for testing and recalibration.

Figure 3:
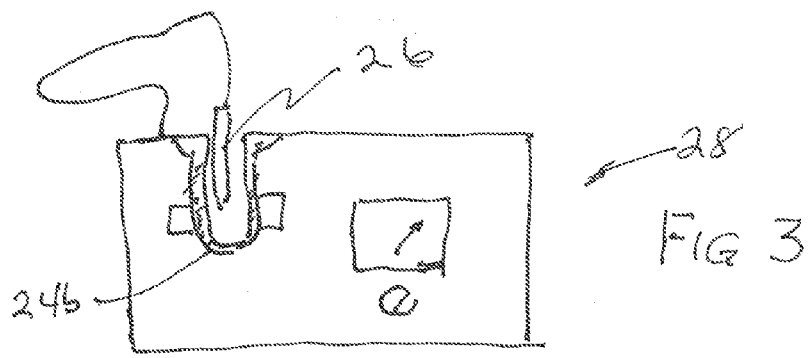
FIG. 3 is a partly schematic sectional view of a calibrator of the invention.

A calibrator 28 of the invention, as depicted in FIGS. 2 and 3, is configured as a portable instrument comprising a reference temperature sensor 26 and a reference thermowell 24b having a controllable temperature. In one mode of operation the reference temperature sensor measures a selected one of the inlet and outlet temperatures and the controller thermowell 24b is controlled to the measured temperature. The other of the inlet and outlet temperature sensors is temporarily installed in the calibrator's thermowell 24b. Both of the heat transfer meter's temperature sensors thereby experience the same temperature so that the heat transfer meter's 10 zero calibration can be checked and adjustments made, if necessary. The calibrator may also have a provision for selectively changing the temperature of the reference thermowell 24b so as to enable the span calibration to be checked and if necessary, recalibrated.

In a "Self-Check" calibrator mode, the temperature at one of the inlet and outlet sensors is measured by the reference sensor 26 and a memory circuit in the calibrator retains that sensor's signal while the calibrator's thermowell temperature is regulated to match it. The reference sensor 26 is then removed from the heat transfer meter and mounted in the calibrator's thermowell 24b thereby enabling the difference between the sensed and controlled temperatures to be determined. This is a "Self Check" feature that allows the temperature difference error between the reference sensor 26 and the calibrator's thermowell 24b to be detected and compensated so that they match precisely. The calibrator 28 can thus be reliably used for very small differential temperature measurements.

The reference sensor 26 from the calibrator 28 is inserted into its own temperature controlled chamber 24b to check its calibration. FIG. 3 shows the calibrator having the reference temperature sensor 26 inserted into the calibrator's thermowell temperature chamber 24b and the difference temperature being displayed. Normally, a zero differential temperature would be indicated as a result of these measurements. If not, correction would be made by adjustment, either manual or automatic. This feature of calibration enables the calibrator 28 to serve as its own differential temperature standard.

FIG. 2 shows a calibration setup usable when the distance between the inlet and outlet temperature sensors is small enough that the calibrator can bridge the distance. Here, an outlet temperature sensor 18 is temporarily installed in the temperature chamber 24b of the calibrator 28. That chamber is typically in the form of a thermowell similar in size and shape to that used by the heat transfer meter. The chamber is controlled to be at the same temperature as the working fluid 15 which is sensed by the calibrator's temperature sensor 26, shown as being temporarily installed in a second thermowell 24a associated with the inlet temperature sensor. The average differential temperature signal produced by the heat transfer meter 10 should then be zero and if it is not, its zero setting is adjusted appropriately. The reader will note that some sort of time averaging is preferably employed in this calibration because when the heat transfer system is in operation, particularly at the beginning and end of a cooling or heating cycle, the sensed temperatures will fluctuate and the calibrator thermowell temperature may have difficulty in keeping up. This problem will be eased, however, if the system has been on for awhile and has generally stabilized; or has been off for awhile. Additional approaches include, without limit, using materials and construction techniques known to provide high thermal transfer rates for the sensor and the thermowell.

Figure 4:
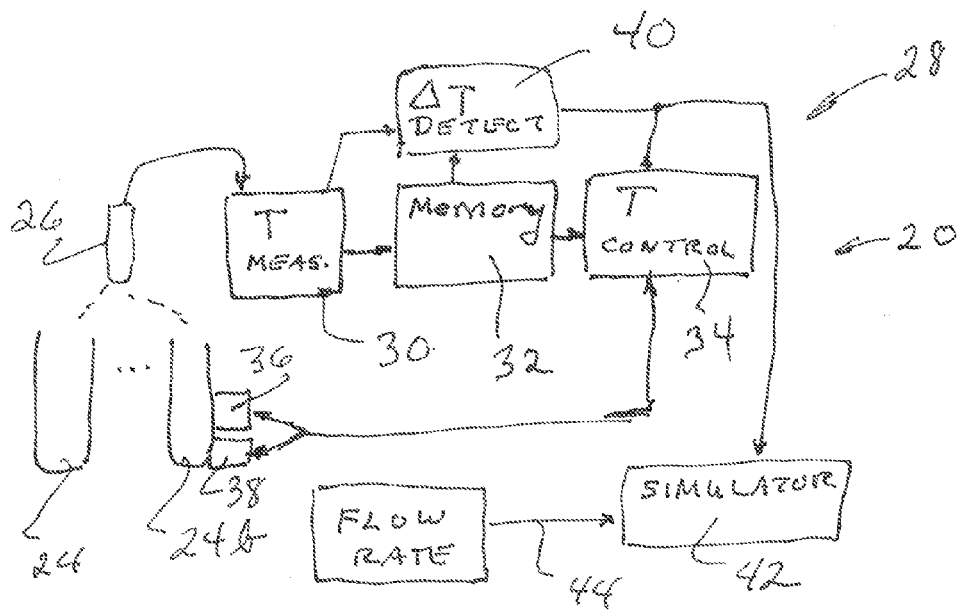
FIG. 4 is a schematic block diagram of thermal measurement circuitry.

FIG. 4 shows a simplified block diagram of the calibrator's circuitry. The reference temperature sensor 26 can be inserted into one of the heat transfer meter's thermowells 24 for calibrating the meter or in the calibrator's thermowell 24b for internal zero differential temperature calibration. The sensed temperature is detected by temperature measurement electronics 30 which provide the corresponding temperature responsive signal to a memory block 32, such as a sample and hold circuit or a digital storage device, which then provides the temperature reference signal used by a temperature control circuit 34 for controlling a thermoelectric module 36 and/or resistive heater 38 element attached to the reference temperature chamber 24b to provide heating or cooling. Ideally, the resistance heater 38 or thermoelectric module 36 is operated in a time shared mode so that it can both sense the temperature of the calibration thermowell 24b and act as a heat pump/heater. The differential temperature detector 40 is engaged for detecting the temperature difference between the sensor and chamber when the calibrator is checking itself.

The temperature chamber 24b can also be temperature controlled for a large differential temperature so that the heat transfer meter's span can be tested and adjusted as required.

A preferred calibrator 28 may comprise a heat transfer simulator 42 that combines a simulated flow rate signal 44 with the indicated differential temperature and with the working fluid's known thermal properties to generate a simulated heat transfer value that can be compared with the heat transfer value provided by the unit being tested.

Communications between the calibrator 28 and its temperature sensor 26, although depicted as an electric cable, may be any communications link such an electromagnetic (ex, Wi-Fi), cellular telephone etc. The calibrator temperature chamber 24b may be similarly remotely controlled.

In a preferred embodiment, the heat transfer meter is provided with dual thermowells 50 for both the inlet and outlet temperature sensors. Each of these simultaneously accommodates a respective one of the heat transfer meter's temperature sensors 16, 18 and the reference temperature sensor 26. This facilitates the zero differential and span temperature testing and recalibration.

Figure 7:
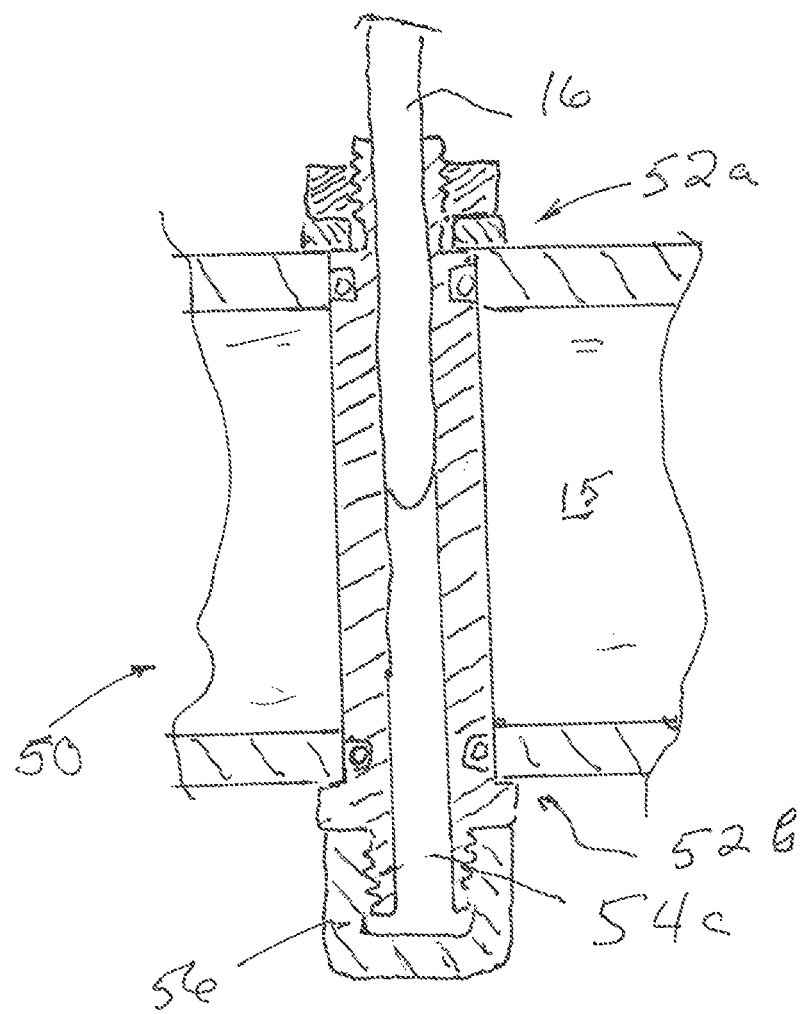
FIG. 7 is a longitudinal cross-sectional view of an alternate embodiment of a thermowell, where the plane of section contains an axis of the thermowell and an axis of a pipe.

Turning now to FIGS. 5-7, one finds examples of preferred dual thermowells 50 solidly connected to the flow passage at both ends 52a, 52b. This is more mechanically stable in the presence of flowing fluid 15 than is a conventional single-ended thermowell. In particularly preferred embodiments the dual thermowell has a streamlined cross section, as depicted in FIG. 6. This is particularly effective at reducing vibration of the thermowell.

The arrangement depicted in FIG. 5 shows one of the meter's temperature sensors (e.g., 16) juxtaposed with the reference temperature sensor in parallel channels 54a, 54b. Alternately, one can configure the dual thermowell with a single throughhole 54c, as depicted in FIG. 7, permitting the two temperature sensors to be inserted from respective ends of the thermowell. The reader will note that FIG. 7 shows a thermowell in its normal operating configuration (i.e., not in the process of being calibrated) in which a cap 56 covers one end of the channel 54c into which the reference temperature sensor can be inserted and placed close to the heat meter's sensor. Both the juxtaposed and single channel arrangements seek to ensure that both temperature sensors are exposed to the same temperature.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. Apparatus for calibrating a heat transfer meter comprising a flow meter, a heat exchanger inlet temperature sensor and a heat exchanger outlet temperature sensor, the apparatus comprising:

at least one thermowell respectively associated with each of the inlet and outlet temperature sensors; and
a calibrator comprising:
a temperature controlled reference thermowell;
a reference temperature sensor having an output, the reference temperature sensor selectively insertable into at least one thermowell respectively associated with each of the inlet and outlet temperature sensors;
temperature measurement circuitry operable to generate a temperature reading from the output of the reference temperature sensor; and
control circuitry operable to control the temperature of the reference thermowell.

2. The apparatus of claim 1 wherein at least one thermowell associated with one of the inlet and outlet temperature sensors is a dual thermowell.

3. The apparatus of claim 2 wherein the dual thermowell extends at least partially across a flow channel.

4. The apparatus of claim 2 wherein the dual thermowell comprises two parallel channels.

5. The apparatus of claim 2 wherein the dual thermowell comprises a throughhole.

6. The apparatus of claim 1 wherein the controller further comprises a memory circuit.

7. The apparatus of claim 1 wherein the calibrator further comprises a flow rate simulator circuit providing an output simulative of a selected flow rate.

8. A method of calibrating a heat transfer meter comprising a flow meter, an inlet temperature sensor and an outlet temperature sensor, the method comprising the steps of:

a) providing a calibrator comprising:
a reference thermowell;
a reference temperature sensor;
a flow rate simulator providing a simulated flow signal; and
control circuitry operable to control a temperature of the reference thermowell;
b) inserting the reference temperature sensor into a thermowell associated with one of the inlet and outlet temperature sensors;
c) inserting the other of the outlet and inlet temperature sensors into the reference thermowell and controlling the temperature of the reference thermowell to differ from that of the reference sensor by a selected amount;
d) calculating, from the selected temperature difference and the simulated flow signal, a simulated value of heat transfer; and
e) comparing the simulated heat transfer value to a heat transfer value output by the meter being calibrated.

* * * * *